United States Patent
Horn

(10) Patent No.: US 9,156,118 B2
(45) Date of Patent: Oct. 13, 2015

(54) METHOD OF OPERATING A PIVOT DRIVE

(75) Inventor: Arnold Horn, Hardheim-Erfeld (DE)

(73) Assignee: WEISS GMBH, Buchen (ODW) (DE)

( * ) Notice: Subject to any disclaimer, the term of this patent is extended or adjusted under 35 U.S.C. 154(b) by 402 days.

(21) Appl. No.: 13/643,024

(22) PCT Filed: Apr. 21, 2011

(86) PCT No.: PCT/EP2011/002049
§ 371 (c)(1),
(2), (4) Date: Oct. 23, 2012

(87) PCT Pub. No.: WO2011/131367
PCT Pub. Date: Oct. 27, 2011

(65) Prior Publication Data
US 2013/0036864 A1    Feb. 14, 2013

(30) Foreign Application Priority Data
Apr. 23, 2010 (DE) .................. 10 2010 018 003

(51) Int. Cl.
*G06F 19/00* (2011.01)
*B23Q 15/26* (2006.01)
*B23Q 16/02* (2006.01)

(52) U.S. Cl.
CPC .............. *B23Q 15/26* (2013.01); *B23Q 16/02* (2013.01); *B23Q 2220/004* (2013.01); *G05B 2219/43115* (2013.01); *G05B 2219/49061* (2013.01); *G05B 2219/49065* (2013.01); *G05B 2219/49087* (2013.01); *G05B 2219/50047* (2013.01); *Y10T 74/1214* (2015.01)

(58) Field of Classification Search
USPC ........... 495/24, 242, 307; 409/162, 167, 132; 29/563, 26 A; 700/153
See application file for complete search history.

(56) References Cited

U.S. PATENT DOCUMENTS

| 5,134,782 | A | * | 8/1992 | Breyer et al. ................ 33/503 |
| 5,730,643 | A | * | 3/1998 | Bartlett et al. .................. 451/8 |
| 5,798,999 | A | * | 8/1998 | Labinsky et al. ........... 369/266 |

(Continued)

FOREIGN PATENT DOCUMENTS

| DE | 33 14 105 A1 | 10/1983 |
| DE | 4028763 C2 | 9/1993 |

(Continued)

OTHER PUBLICATIONS

International Search Report (English and German) and Written Opinion (in German) for PCT/EP2011/002049, mailed Feb. 3, 2012; ISA/EP.

(Continued)

*Primary Examiner* — Kidest Bahta

(57) ABSTRACT

The present invention relates to a method for operating a pivot drive, in particular a rotary indexing unit (10), having a rotating plate (12) which can be driven by a motor to execute a rotary movement about a rotation axis (R). A sensor (24, 24') is provided, which provides sensor data, in particular angle data, is connected to a control device (26) and serves to monitor a rotary movement of the motor (22), the rotating plate (12) and/or a rotating component of a drive train which is arranged between the motor and the rotating plate. The sensor data is compared with predefined setpoint data, which is stored in the control device (26), in order to adjust at least one parameter which characterizes or influences the rotary movement if there is a deviation between the sensor data and the setpoint data, in order to minimize the ascertained deviation.

18 Claims, 1 Drawing Sheet

(56) References Cited

U.S. PATENT DOCUMENTS

| | | | |
|---|---|---|---|
| 5,887,430 A * | 3/1999 | Hirai et al. | 60/433 |
| 6,293,742 B1 * | 9/2001 | Miyagi et al. | 409/132 |
| 2006/0179984 A1 * | 8/2006 | Stoops | 83/34 |
| 2007/0039415 A1 | 2/2007 | Weiss | |
| 2009/0120330 A1 * | 5/2009 | Stoops | 108/7 |

FOREIGN PATENT DOCUMENTS

| | | |
|---|---|---|
| DE | 102 37 266 A1 | 3/2003 |
| DE | 102008048164 A1 | 4/2010 |
| EP | 1 754 566 A1 | 2/2007 |
| EP | 2 093 642 A1 | 8/2009 |

OTHER PUBLICATIONS

English Translation of International Preliminary Report on Patentability (Chapter I) for PCT/EP2011/002049, issued Oct. 23, 2012.

German Search Report for German Patent Application No. 10 2010 018 003.3, dated Feb. 2, 2011 with English Translation.

* cited by examiner

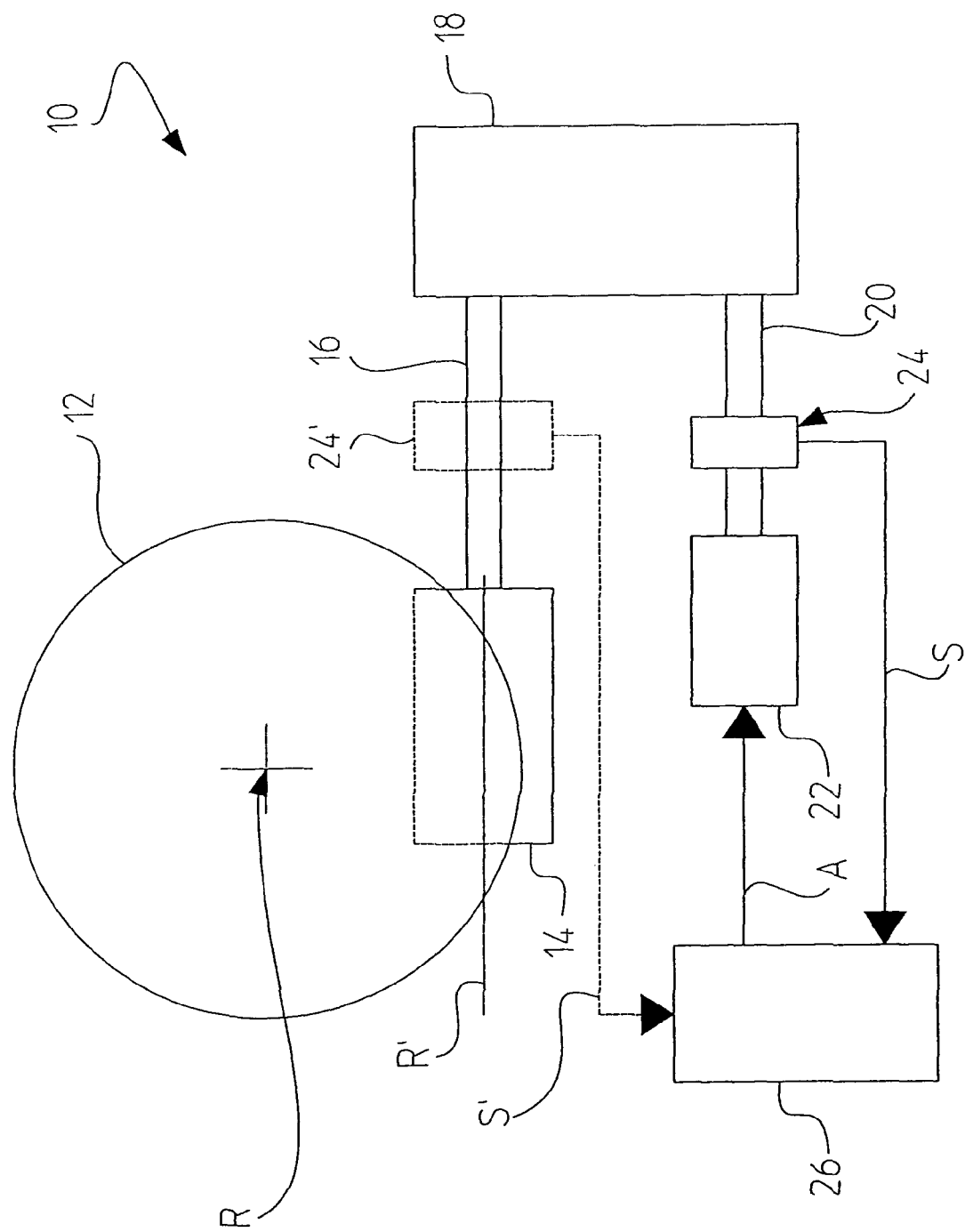

METHOD OF OPERATING A PIVOT DRIVE

CROSS-REFERENCE TO RELATED APPLICATIONS

This application is a 371 U.S. National Stage of International Application No. PCT/EP2011/002049, filed on Apr. 21, 2011. This application claims priority to German Application No. 10 2010 018 003.3, filed on Apr. 23, 2010. The contents of the above applications are herein incorporated by reference in their entirety.

The present invention relates to a method of operating a pivot drive, in particular of a in particular rotary indexing table, having a turntable which can be driven to make a rotational movement about an axis of rotation.

Rotary indexing tables are in widespread use, for example, in assembly and automation technology. Workpieces are, for example, arranged on the turntable which are set into continuous or clocked rotational movements for their machining and/or assembly. In this respect, the precision of the rotational movement is of special significance so that the workpiece always has well-defined positions/orientations relative to the respective assembly tools or processing tools.

It is understood that the operational behavior of a pivot drive or of a rotary indexing table depends on the external strains. In other words, the behavior of a pivot drive changes when the strains acting on it are changed. In addition, wear phenomena at components of the pivot drive or a replacement of components can have the result that the behavior of the pivot drive is changed. The named causes can go so far that the required movement profile of the turntable can no longer be produced in the required precision by the pivot drive.

It is therefore the object of the present invention to provide a method for an operation of a pivot drive which is as reliable and as precise as possible and by which in particular different operating states can be taken into account. The method should moreover be as simple as possible to implement.

This object is satisfied by a method having the features of claim 1.

The method in accordance with the invention is used in a pivot drive having a turntable which can be driven by a motor to make a rotational movement about an axis of rotation. At least one sensor is provided which delivers sensor data, in particular angular data, and is connected to a control device for monitoring a rotational movement of the motor, of the turntable and/or of a rotating component of a drive train arranged between the motor and the turntable. In accordance with the invention, the sensor data are compared with predefined DESIRED data which are stored in the control device to adapt at least one parameter characterizing or influencing the rotational movement on a deviation of the sensor data from the DESIRED data to minimize the determined deviation.

In other words, the operation of the pivot drive is monitored by a sensor, with the monitoring not necessarily having to take place directly at the turntable or at the motor. The sensor can also, for example, be arranged so that it monitors the rotational movement of one or more components of a transmission disposed between the motor and the turntable. It is also possible to provide a plurality of sensors whose data are compared with one another to be able to initiate corresponding countermeasures on deviations which indicate a malfunction.

In this respect, the monitoring serves the purpose of identifying a contour error which indicates the deviation between an ACTUAL position of the component monitored by the sensor and a DESIRED position thereof. If, for example, the turntable is located at a specific time at a rotational/angular position (ACTUAL value) which does not correspond to a predefined rotational/angular position DESIRED value), it is recognized that a contour error is present. To reduce this, at least one parameter is varied which characterizes the rotational movement or influences it.

The parameter characterizing the rotational movement is, for example, a speed, an acceleration of the turntable or a drive parameter which reflects the state of the drive of the pivot drive such as a power consumption or other operating parameters of a drive motor. However, not only a fixed value which characterizes the rotational movement at a specific time or in a specific rotational position is to be understood as a parameter. It can also be understood as a function. That is, a determined contour error can, for example, be utilized to adapt a speed profile or an acceleration profile of the turntable movement to minimize the contour error.

In order not to generate any overregulation of the turntable movement, provision can be made that the sensor data are determined during a measuring cycle which includes a predetermined time or a predetermined amount of the rotational movement. The determined sensor data (ACTUAL values), which are present in the form of a predetermined number of discrete individual data, with the predetermined number depending, for example, on the resolution behavior of the sensor, are compared with the corresponding DESIRED values to determine an ACTUAL/DESIRED error which is specific to a measuring cycle and which is used as a basis for the adaptation of at least one parameter. Such a measuring cycle can, for example, include one or more movement cycles of the turntable.

After one movement cycle, a cumulative contour error is calculated which is determined from the individual comparisons of the ACTUAL values with the DESIRED values and which forms the basis for the adaptation of one or more parameters of the rotational movement for the next cycle.

The measuring cycle can include at least two measuring intervals for which a respective ACTUAL/DESIRED error is determined which is specific to the measuring cycle, with the ACTUAL/DESIRED error specific to the measuring cycle being determined by an averaging of the ACTUAL/DESIRED error specific to the measuring interval. A measuring cycle includes 5 movement cycles of a rotary indexing table, for example. A contour error is determined for each cycle. An averaged contour error is in turn calculated from the obtained 5 contour errors and is used for adapting the parameter.

Provision can be made that individual values of the sensor data are compared with corresponding individual values of the DESIRED data during the measuring cycle in order continuously to update an ACTUAL/DESIRED error and to compare it with a threshold value. On an exceeding of the threshold value, an error message can be output. This measure makes it possible to abort the measuring cycle when contour errors occur which are too large. This is the case, for example, when a serious disturbance is present (e.g. blockage of the turntable) which could possibly result in serious damage on a further operation of the pivot drive.

The turntable is preferably driven to make a clocked rotational movement, with the turntable in particular being in a position of rest between two cycles. As already mentioned, the above-named measuring cycle can include one or more cycles of the movement of the turntable.

In accordance with an advantageous embodiment, a teaching cycle including a predefined number of measuring cycles is completed for a teaching process for determining a value suitable for a standard operation of the pivot drive or for determining a function of the at least one parameter suitable for a standard operation. The at least one parameter or its function is iteratively adapted in the course of the teaching cycle to minimize the deviation. At least two parameters or their functions are in particular adapted in the course of the teaching cycle, with preferably only one parameter or its function being changed per measuring cycle.

The teaching process can include a predefined number of teaching cycles to obtain a parameter value set or a set of functions of the parameter, with the parameter set or the function set being averaged to determine a parameter value suitable for a standard operation or a suitable averaged function of the parameter.

Provision can be made to carry out the teaching process in a non-loaded state of the pivot drive and/or in a loaded state of the pivot drive. Different load states are preferably taught to be able to make use of previously taught values on changes of load without a repeat teaching process having to be carried out. It is understood that the teaching process can already take place ex works or at the deployment site of the pivot drive.

At least one threshold value can be determined on the basis of the value of the parameter suitable for a standard operation or of the function of the parameter suitable for a standard operation, with an exceeding and/or falling below of said threshold value triggering an error message or a monitoring message in a standard operation of the pivot drive. In other words, the parameter value or its function is itself used to determine a tolerance range. As long as the contour error does not move out of the tolerance range, it is assumed that the pivot drive is working properly. Only deviations which move out of the tolerance range result in error messages or a monitoring message. Such messages can be of an acoustic and/or optical type. Messages can also be output which result in an operating stop. The message can be used to indicate to a user that a new teaching process is required. Such a process can also be initiated automatically.

The invention further relates to a pivot drive, in particular to a rotary indexing table having a turntable, which can be driven by a motor to make a rotational movement about an axis of rotation, with at least sensor delivering sensor data, in particular angular data, and connected to a control device, being provided for monitoring a rotational movement of the motor, of the turntable and/or of a rotating component of a drive train arranged between the motor and the turntable. The control device is designed for carrying out the method in accordance with at least one of the above-described embodiments.

The turntable of the pivot drive can have drivers which engage into a drive groove of a barrel cam, with the turntable being drivable via the barrel cam to make the rotational movement about the axis of rotation which is in turn drivable by a motor to make a rotational movement about its longitudinal axis.

Further embodiments of the present invention are set forth in the description, in the drawings and in the dependent claims.

The invention will be described in the following purely by way of example with reference to advantageous embodiments and to the enclosed drawing.

The only FIGURE schematically shows a rotary indexing table 10 which has a turntable 12 on which workpieces can be clamped for machining and/or assembly. The turntable 12 is driven by a barrel cam 14 to make a rotational movement about an axis of rotation R which extends perpendicular to the plane of the FIGURE. To transmit a drive movement of the barrel cam 14 in the form of a rotation thereof about an axis of rotation R' perpendicular to the axis of rotation R of the turntable 12 to the turntable 12, the latter has drivers (not shown) which engage with a constant or varying pitch in a manner known per se into a drive groove (not shown) running around the barrel cam 14 spirally.

The barrel cam 14 is rotationally fixedly connected to a drive shaft 16. The drive shaft 16 is in turn connected to an output of a transmission 18. Its input is connected to a motor shaft 20. The motor shaft 20 is driven by a motor 20 to make a rotational movement.

A rotary sensor 24 is arranged at the motor shaft 20 and detects the rotational movement of the motor shaft 20 and transfers corresponding measured sensor values S to a control unit 26. The control unit 26 processes the measured sensor values S and evaluates them. The control unit 26 determines by a comparison of the measured sensor values S with reference values (ACTUAL/DESIRED comparison) whether the detected rotational movement corresponds to the presets and adapts a parameter or a function of the parameter which characterizes the rotational movement as required. For example, an acceleration profile is adapted which is required for generating the desired movement profile of the turntable 12. The acceleration profile ultimately in turn serves for controlling the drive power output by the motor 22. To realize this control, the control unit 26 communicates control instructions A to the motor 22.

In other words, a closed loop is present which directly monitors the rotational movement of the motor shaft 20 of the motor 22 and ultimately exerts an effect on the rotational movement of the turntable 12 on the basis of the data determined in this manner in that the control of the motor 22 is adapted.

Alternatively or additionally, a rotary sensor 24' (shown in dashed lines) can be provided which detects the rotational movement of the drive shaft 16 or its respective angular position and transmits corresponding measured sensor values S' to the control unit 26. If only the sensor 24' is present, the drive power produced by the motor 22 is detected indirectly, whereas the rotational movement of the barrel cam 14 or its respective angular position is monitored directly. The monitoring thus takes place "closer" to the turntable 12, whereby effects which are difficult to quantify of the transmission 18, which cannot be produced completely free of play in practice, enter into the measured sensor values S'. In other words, the measured sensor values S' as a rule represent the position of the turntable 12 better than the measured sensor values S since there only angular errors enter in connection with the driver-drive groove coupling, but not angular errors in connection with the transmission 18.

The control of the position of the turntable 12 also takes place via control instructions A to the motor 22 in this variant. The control instructions A are then determined in dependence on the measured sensor values S'.

In embodiments which have both sensors 24, 24', the measured sensor values S, S' can be taken into account together, for example for diagnosing the state of the drive train of the rotary indexing table 10 or of its components (e.g. transmission 18) or within the framework of a fine tuning of the operating parameters for its control.

It is understood that additionally or alternatively sensors can be provided at the turntable 12 and/or at rotating components of the transmission 18 to monitor the operation of the rotary indexing table 10.

To prepare the rotary indexing table 10 for a standard operation, it is tested under different conditions. A DESIRED data set is first stored in the control unit 26 which indicates which angular position the monitored component should have at any given time. On a subsequent test run, it is determined whether the actual rotational movement which is determined by the sensor 24, 24' corresponds to the stored DESIRED values. This means that at specific times the angular position of the monitored, rotatably supported component is determined (ACTUAL value) and is compared with a corresponding DESIRED value. A deviation of the ACTUAL value from the corresponding DESIRED value is called a contour error.

If an instantaneous ACTUAL/DESIRED deviation is present which exceeds a certain threshold value, the test run is interrupted or aborted since it can be assumed that a serious functional disturbance is present. Otherwise, the individual results of the discrete ACTUAL/DESIRED comparisons are stored and are converted into a cumulative contour error at the end of a first measuring cycle. The measuring cycle can, for example, be defined by a certain time period or by a certain angle of rotation of the turntable. With a rotary indexing table for the clocked movement of a workpiece, it is obvious to use one or more movement cycles as a measuring cycle.

The cumulative contour error of a measuring cycle allows statements on how large the deviation of the actual movement from the desired movement profile is. To minimize the cumulative contour error, at least one predefined parameter is changed which characterizes the movement profile of the turntable. This can, for example, be a speed or an acceleration. It is also possible to adapt a speed profile or an acceleration profile to achieve a minimization of the cumulative contour error. An acceleration ramp/acceleration function can, for example, be varied to accelerate the turntable from a position of rest more slowly or faster.

In the next measuring cycle, a cumulative contour error is again determined and compared with the preceding one. A decision is now taken on the basis of this comparison whether an increase or a decrease in the contour error has occurred. The previously changed parameter (or its function) is again changed in dependence on this. Alternatively, a different parameter can also be changed to achieve a better adaptation of the ACTUAL operation to the preset DESIRED conditions.

The above-described procedure is carried out for so long until an acceptable contour error is achieved. To design the process as more robust, provision can be made that a measuring cycle is divided into a plurality of measuring intervals. The contour errors determined in the individual intervals are averaged to determine an averaged cumulative contour error which serves as the basis for an adaptation of at least one of the parameters. The teaching process admittedly thereby becomes somewhat more complex, but random "overshoots" or measuring errors thus have less weight.

It is understood that, alternatively or additionally, a plurality of teaching cycles can be carried out with a predefined number of measuring cycles to obtain a plurality of parameter sets or function sets of the parameters which are in turn averaged.

At the end of the process there is an iteratively changed characteristic parameter which generates a movement profile for the non-loaded state which comes closest to the wanted DESIRED profile. An optimized acceleration profile of the turntable is obtained, for example. It is understood that in many cases not only one parameter or its function is subjected to an optimization. With a little more effort, two or more parameters can also be optimized to adapt the movement profile of the turntable to the expectations.

The above-described method can be repeated for different load states in order thus to obtain different parameter sets or parameter function sets which can then be selected in standard operation in accordance with the respectively present demand profile. This does not preclude that the respective present load situation at the site of deployment is subjected to a separate teaching process to obtain results which are as good as possible.

The method can be used in a plurality of different pivot drives and in particular in rotary indexing tables. In rotary indexing tables having a turntable which has drivers engaging into a drive groove of a barrel cam provided with at least one latching path and which is therefore driven by a rotation of the barrel cam to make a clocked rotational movement, the method can in particular also advantageously be used to optimize a positioning of the drivers with respect to the latching path. It is the aim in this respect, for example, to bring a driver located in the latching path into an ideal starting position by a precise barrel cam movement (e.g. trailing) so that a subsequent acceleration phase can be exactly initiated. The precision of the operation of the rotary indexing table required for this purpose can be ensured by the above-described method and its individual embodiments.

The invention claimed is:

1. A method of operating a pivot drive having a turntable which can be driven by a motor to make a rotational movement about an axis of rotation, wherein at least one sensor is provided which delivers sensor data and which is connected to a control device for monitoring a rotational movement of the motor of the turntable and/or of a rotating component of a drive train arranged between the motor and the turntable,
    wherein the sensor data are compared with predefined DESIRED data which are stored in the control device to adapt at least one parameter characterizing or influencing the rotational movement on a deviation of the sensor data from the DESIRED data to minimize the determined deviation,
    wherein the sensor data are determined during a measuring cycle which includes a predefined time period or a predefined amount of the rotational movement and the determined sensor data are compared with the corresponding DESIRED data to determine an ACTUAL/DESIRED error which is specific to the measuring cycle and which is used as the basis for the adaptation of the at least one parameter,
    wherein individual values of the sensor data are compared with corresponding individual values of the DESIRED data during the measuring cycle in order continuously to update an ACTUAL/DESIRED error and to compare this error with a threshold value.

2. A method in accordance with claim 1, wherein the pivot drive is a rotary indexing table.

3. A method in accordance with claim 1, wherein the data delivered by the sensor is angular data.

4. A method in accordance with claim 1, wherein the turntable is driven to make a clocked rotational movement.

5. A method in accordance with claim 4, wherein the turntable is in a position of rest between two cycles.

6. A method in accordance with claim 1, wherein the at least one parameter is a speed, an acceleration, a speed function, an acceleration function or a drive parameter.

7. A method in accordance with claim 1, wherein the measuring cycle includes at least two measuring intervals for which a respective ACTUAL/DESIRED error is determined which is specific to the measuring cycle, with the ACTUAL/DESIRED error specific to the measuring cycle being determined by an averaging of the ACTUAL/DESIRED error specific to the measuring interval.

8. A method in accordance with claim 1, wherein an error message is output on an exceeding of the threshold value.

9. A method in accordance with claim 1, wherein the measuring cycle includes one or more cycles of the movement of the turntable.

10. A method of operating a pivot drive having a turntable which can be driven by a motor to make a rotational movement about an axis of rotation, wherein at least one sensor is provided which delivers sensor data and which is connected to a control device for monitoring a rotational movement of the motor of the turntable and/or of a rotating component of a drive train arranged between the motor and the turntable,
  wherein the sensor data are compared with predefined DESIRED data which are stored in the control device to adapt at least one parameter characterizing or influencing the rotational movement on a deviation of the sensor data from the DESIRED data to minimize the determined deviation,
  wherein the sensor data are determined during a measuring cycle which includes a predefined time period or a predefined amount of the rotational movement and the determined sensor data are compared with the corresponding DESIRED data to determine an ACTUAL/DESIRED error which is specific to the measuring cycle and which is used as the basis for the adaptation of the at least one parameter,
  wherein a teaching cycle including a predefined number of measuring cycles is completed for a teaching process for determining a value of the at least one parameter suitable for a standard operation or a function of the at least one parameter suitable for a standard operation, with the at least one parameter or its function being adapted iteratively in the course of the teaching cycle to minimize the deviation.

11. A method in accordance with claim 10, wherein at least two parameters or their functions are adapted in the course of the teaching cycle.

12. A method in accordance with claim 11, wherein one parameter or its function is changed per measuring cycle.

13. A method in accordance with claim 10, wherein the teaching process includes a predefined number of teaching cycles to obtain a parameter value set or a set of time functions of the parameter, with the parameter set or the function set being averaged to determine a parameter value suitable for a standard operation or a suitable averaged function of the parameter.

14. A method in accordance with claim 10, wherein at least one threshold value is determined on the basis of the value of the parameter suitable for a standard operation or of the function of the parameter suitable for a standard operation, with an exceeding and/or falling below of said threshold value triggering an error message in a standard operation of the pivot drive.

15. A method in accordance with claim 10, wherein the teaching process is carried out in a non-loaded state of the pivot drive and/or in a loaded state of the pivot drive.

16. A pivot drive having a turntable which can be driven by a motor to make a rotational movement about an axis of rotation, wherein at least one sensor is provided which delivers sensor data and is connected to a control device for monitoring a rotational movement of the motor, of the turntable and/or of a rotating component of a drive train arranged between the motor and the turntable, wherein the control device is designed to carry out a method of operating the pivot drive in which method the sensor data are compared with predefined DESIRED data which are stored in the control device to adapt at least one parameter characterizing or influencing the rotational movement on a deviation of the sensor data from the DESIRED data to minimize the determined deviation, wherein the turntable has drivers engaging into a drive groove of a barrel cam, with the turntable being able to be driven via the barrel cam to make a rotational movement about the axis of rotation which can in turn be driven by a motor to make a rotational movement about its longitudinal axis.

17. A pivot drive in accordance with claim 16, wherein the data delivered by the sensor is angular data.

18. A pivot drive in accordance with claim 16, wherein said pivot drive is a rotary indexing table.

\* \* \* \* \*